(12) United States Patent
Hundt (10) Patent No.: US 8,732,158 B1
(45) Date of Patent: May 20, 2014

(54) METHOD AND SYSTEM FOR MATCHING QUERIES TO DOCUMENTS

(75) Inventor: Christopher James Hundt, Berkeley, CA (US)

(73) Assignee: Google Inc., Mountain View, CA (US)

( * ) Notice: Subject to any disclaimer, the term of this patent is extended or adjusted under 35 U.S.C. 154(b) by 147 days.

(21) Appl. No.: 13/467,923

(22) Filed: May 9, 2012

(51) Int. Cl.
*G06F 17/30* (2006.01)

(52) U.S. Cl.
USPC .......................................................... 707/713

(58) Field of Classification Search
CPC ................................................ G06F 17/30103
USPC .......................................................... 707/713
See application file for complete search history.

(56) References Cited

U.S. PATENT DOCUMENTS

| 7,814,204 | B1* | 10/2010 | Wang et al. | 709/226 |
|---|---|---|---|---|
| 2005/0210003 | A1* | 9/2005 | Tsay et al. | 707/3 |
| 2012/0087267 | A1* | 4/2012 | Norair | 370/252 |
| 2013/0185304 | A1* | 7/2013 | Li et al. | 707/740 |

OTHER PUBLICATIONS

Wikipedia, "FIFO—Wikipedia, the free encyclopedia" <http://en.wikipedia.org/wiki/FIFO>.*

* cited by examiner

*Primary Examiner* — Hung Q Pham
(74) *Attorney, Agent, or Firm* — Sterne, Kessler, Goldstein & Fox P.L.L.C.

(57) ABSTRACT

Methods, systems, and articles of manufacture for the analysis of large document archives by matching queries against documents are disclosed. These include generating an ordered sequence of query tokens for each query, generating an ordered sequence of document tokens for each document, selecting an ordered sequence of document tokens from the tokenized one or more documents, selecting an ordered sequence of query tokens from the tokenized one or more queries, configuring a buffer to hold a subsequence of the selected ordered sequence of document tokens, comparing the selected ordered sequence of query tokens to successive subsequences of the selected ordered sequence of document tokens in the configured buffer where each of the successive subsequences and the selected ordered sequence of query tokens have the same length in tokens, and determining a match result based upon the comparison.

17 Claims, 7 Drawing Sheets

METHOD AND SYSTEM FOR MATCHING QUERIES TO DOCUMENTS

BACKGROUND

1. Field

This disclosure relates generally to analyzing document collections.

2. Background

Analyzing large collections of documents to detect the presence of a term or expression can be time consuming. When such document collections are analyzed to detect the presence of any of multiple terms or expressions, the computing demand becomes substantially greater.

Exemplary large collections of documents can include, for example, corporate email archives, corporate document archives, system log files, electronic book collections, and the like. Applications may require repeated analysis of such archives for the presence of various terms or expressions. During the analysis of these archives, it may also be desired that statistics are collected related to the presence of the terms and expressions of interest in the archives.

SUMMARY OF EMBODIMENTS

To keep pace with the ever increasing size of these archives of digital documents, more efficient methods and systems for analyzing such collections are desired. Methods, systems, and articles of manufacture for the analysis of large document archives by matching queries against documents are disclosed. These include tokenizing one or more queries to generate an ordered sequence of query tokens for each query, tokenizing one or more documents to generate an ordered sequence of document tokens for each document, selecting an ordered sequence of document tokens from the tokenized one or more documents, selecting an ordered sequence of query tokens from the tokenized one or more queries, configuring a buffer to hold a subsequence of the selected ordered sequence of document tokens, comparing the selected ordered sequence of query tokens to successive subsequences of the selected ordered sequence of document tokens in the configured buffer where each of the successive subsequences and the selected ordered sequence of query tokens have the same length in tokens, and determining a match result based upon the comparison.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

While illustrative embodiments for particular applications are described in the present disclosure, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Embodiments disclosed herein enable efficient analysis of large document archives. For example, embodiments enable the matching of a plurality of queries to a plurality of documents in the collection. Exemplary document collections, sometimes also referred to as document archives, include, but are not limited to, corporate email archives, corporate document archives, system log files, electronic book collections, and the like. Air embodiment may be used in a litigation support environment to assist in electronic discovery. An electronic discovery application may require that one or more large corporate document archives, such as, for example, email archives, system log archives, draft document archives, etc., are analyzed to detect the presence of a group of particular terms or expressions. The analysis may require the matching of multiple queries, each including one or more query terms or expressions, to each document in a large collection of documents. The analysis may also require that statistics are collected to summarize the analysis. Many other applications may have similar requirements. Embodiments may be configured to match multiple queries to multiple documents in large document collections in an efficient and scalable manner. Moreover, some embodiments provide statistics to determine which queries matched which documents, documents that matched all queries, and documents that matched no queries.

Document collections are often suitable for processing by a large number of concurrent or parallel processes. The email archive of a corporation, for example, may include millions of emails, and may result in searching hundreds of millions of small documents (e.g., individual emails) for the presence of selected keywords and expressions. By subdividing the archive to smaller collections, the analysis of the entire archive may be completed in a relatively short time. In systems, such as litigation support systems, applications such as the above noted email archive processing application may have to be run repeatedly and frequently. Therefore, flexible approaches to processing a plurality of files using concurrent processes are useful.

Figure 1A:
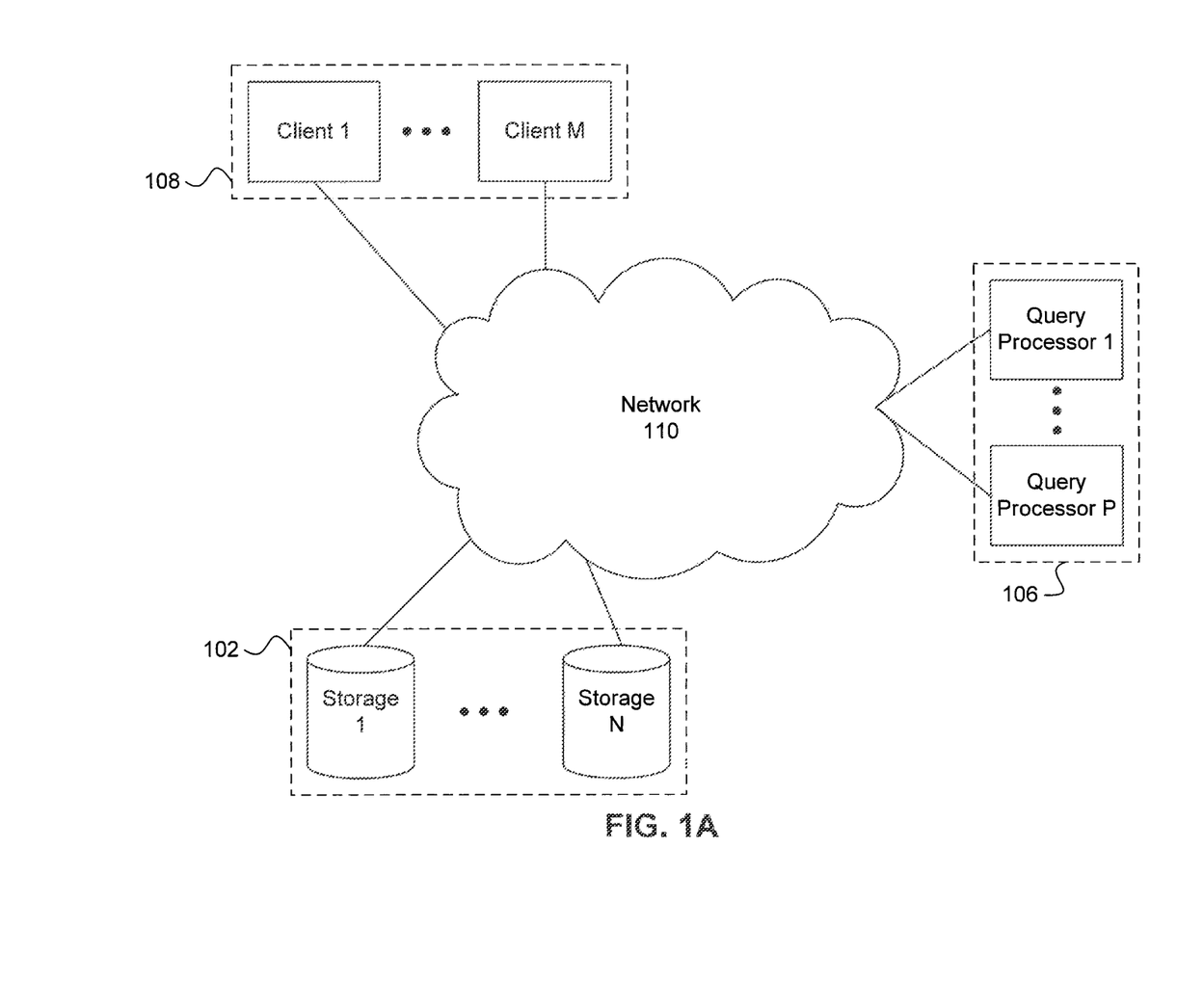
FIG. 1A illustrates a network environment for matching queries to documents, according to an embodiment.

FIG. 1A illustrates a network environment 100 for matching queries to documents, according to an embodiment. Network environment 100 includes a plurality of file storage locations 102 (identified as file storage 1 . . . N), and a plurality of processing servers 106 (identified as query processors 1 . . . P) interconnected by a network 110.

File storage 102 can include file servers, disk drives in user computers including mobile computers, and/or other digital storage devices. File storage 102 can have stored on them, documents, such as text documents, and multimedia documents that include text. The stored documents may be in any storage format.

A plurality of clients 108 (identified as clients 1 . . . M) may communicate with one or more processing servers 106 to query documents in file storage 102 and to receive the results of such queries. Clients 108 can include personal computers, mobile computers, and the like through which users can query the documents in file storage 102.

Processing server 106 may receive queries for processing and may return results to client 108. In another embodiment, an intermediate server (not shown) may facilitate the interaction between client 108 and processing server 106. Processing server 106 can include one or more server computers, personal computers, or other computing devices which can execute the embodiments to detect the presence of predetermined keywords and expressions. Processing server 106 may include one or more computers in a server farm or cloud computer.

Network 110 can include one or more wide area networks and/or local area networks interconnecting file storage 102 and processing server 106. A multi-site geographically distributed corporate network and the Internet are exemplary wide area networks. An Ethernet and/or wireless network at a single site of an organization and a home network are exemplary local area networks.

Figure 1B:
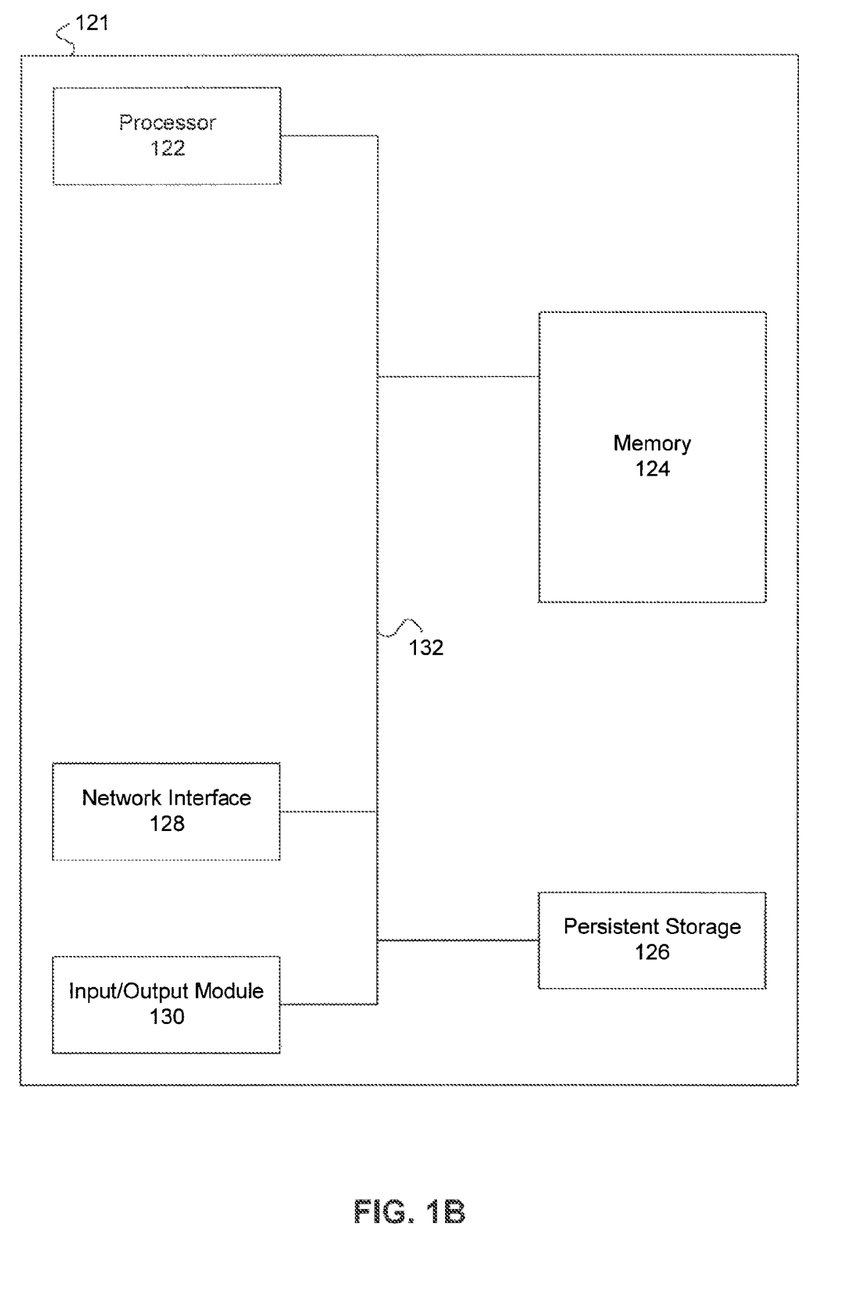
FIG. 1B illustrates a computer system in which embodiments can be executed.

FIG. 1B illustrates a computer system 121 in which embodiments can be executed to efficiently detect the presence of predetermined terms or expressions in large document archives. Computer system 121 includes a processor 122 which may include any computer or electronic processor for executing logic instructions and/or processing information, including text information. Processor 122 may include or be part of any device capable of processing any sequence of instructions. Processor 122 may include, for example, a computer processor, a processor in a mobile device, or other electronic and/or digital processor. Processor 122 may, for example, be included in a computer, a mobile computing device, a set-top box, an entertainment platform, a server, a server farm, a cloud computer and the like.

Processor 122 may be connected to a memory 124 via a bus 132. Memory 124 is a storage medium and may include volatile memory to store information for use by or output by the system 121. Memory 124 may include, for example, random access memory (RAM) and/or dynamic RAM (DRAM). Memory 124 may be used to store any information, such as state information of system 121. Memory 124 may, for example, may also be used to store instructions of computer system 121, including instructions of query matching system 200 illustrated in FIG. 2. Computer system 121 may include one or more processors 102 as necessary or appropriate.

Bus 132 may include a communication infrastructure that allows interaction between the various components of computer system 121. Bus 132 may, for example, carry data between the components of computer system 121, such as between processor 122 and memory 124. Bus 132 may include a wireless and/or wired communications medium between the components of computer system 121, and may include parallel, serial or other topological arrangements.

A persistent storage 126 may include components such as memory or other persistent storage to store data over some extended period of time (e.g., as compared to memory 124). Persistent storage 126 may include non-volatile main memory as used by processor 122 in computer system 121. Persistent storage 126 may include, for example, flash memory, a hard disk, optical disk or other computer-readable storage medium.

Network interface 128 can be one or more of a wired or wireless network interface that couples computer system 121 to one or more other computer systems directly or indirectly through a network such as network 110.

Input/output module 130 can be one or more of an interface to input devices such as keyboard, mouse, and the like, and an interface to output devices such as display, external hard drives and the like.

Figure 2:
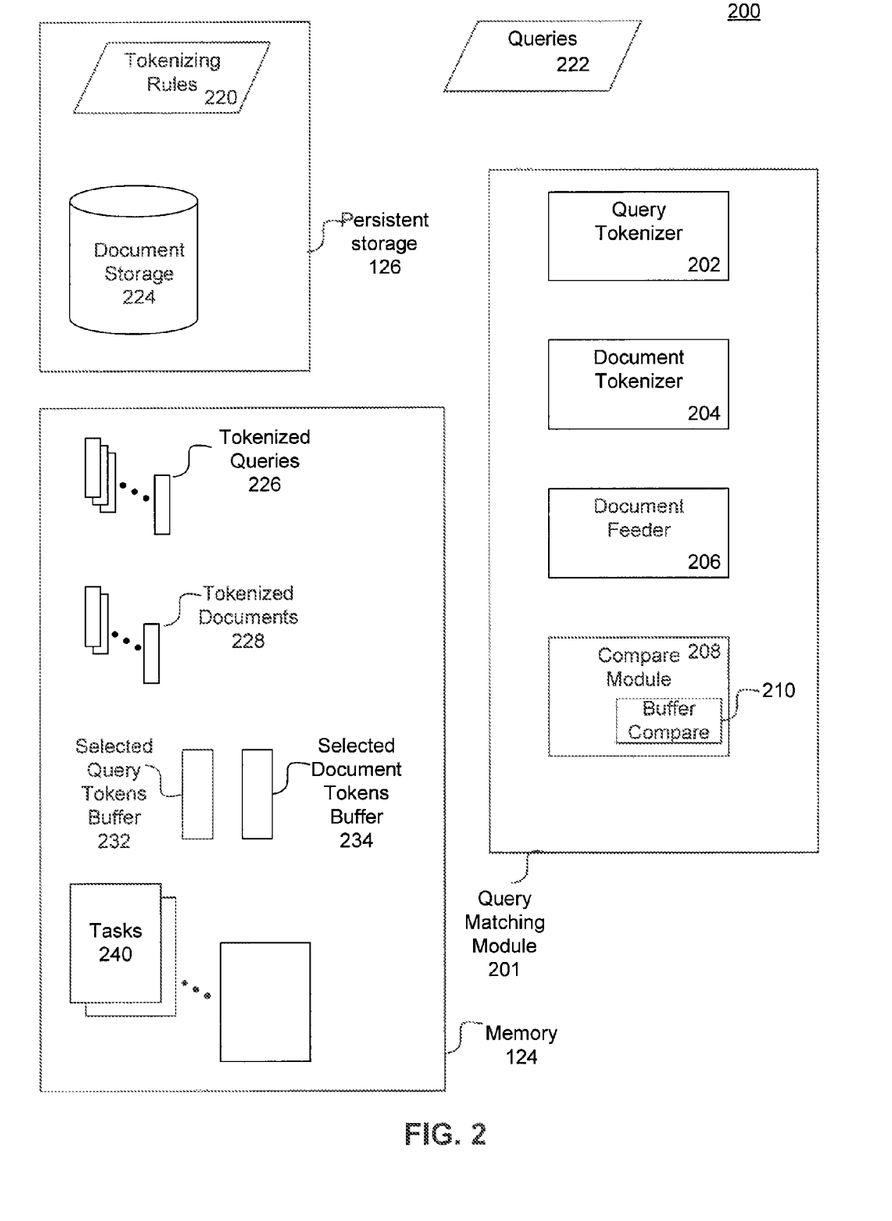
FIG. 2 illustrates a system for document analysis, according to an embodiment.

FIG. 2 illustrates a system 200 a document analysis system, according to an embodiment. System 200 includes a query matching module 201 configured to match queries to documents, according to an embodiment. Query matching module 201 may include a query tokenizer 202, a document tokenizer 204, a document feeder 206, and a compare module 208. Compare module 208 may include a buffer compare 210.

Figure 5:
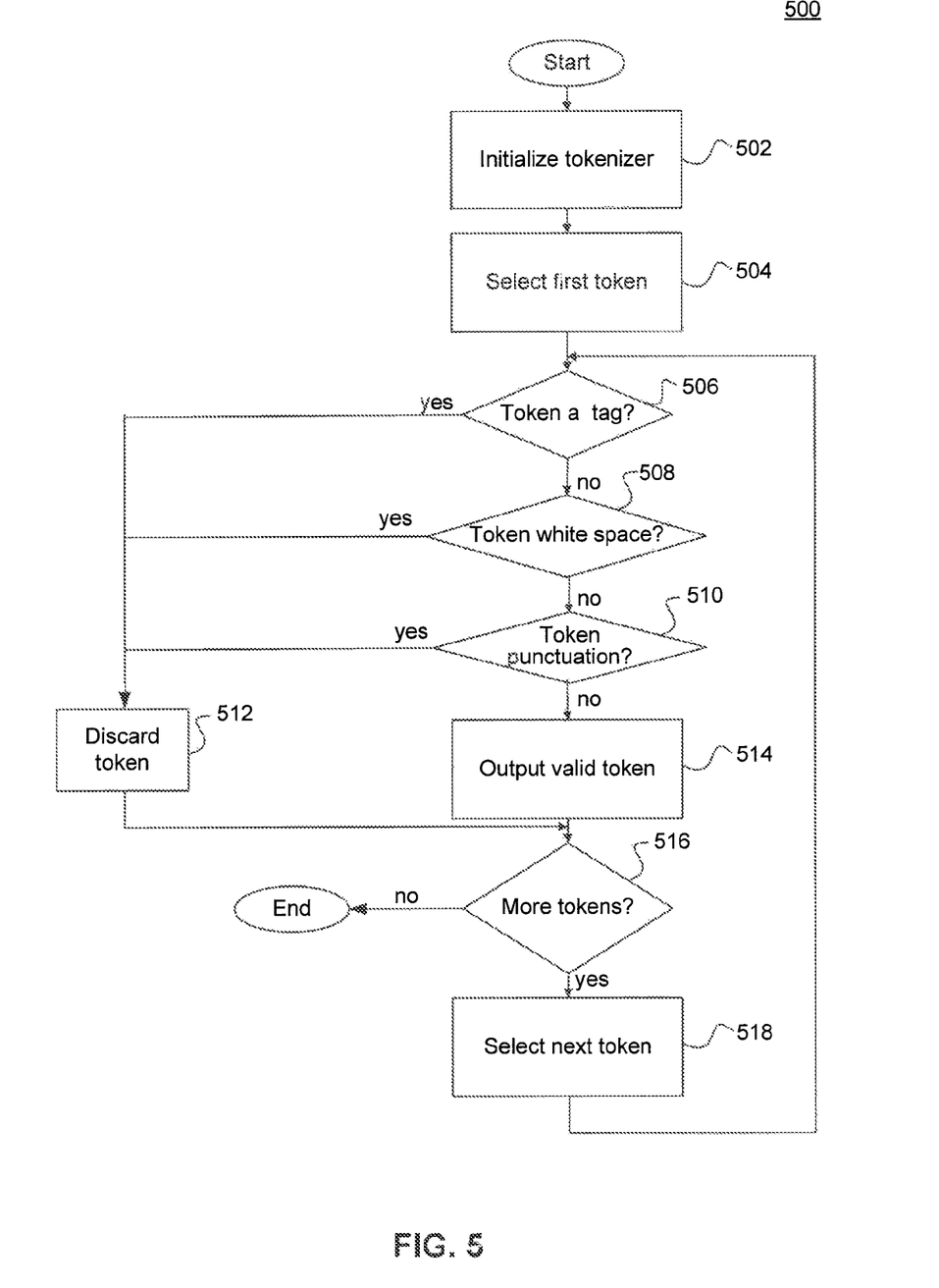
FIG. 5 illustrates a method for tokenizing documents and queries, according to an embodiment.

Query tokenizer 202 and document tokenizer 204 are configured to tokenize the received queries and documents to be processed, respectively. FIG. 5, for example, illustrates a method for tokenizing that can be performed by query tokenizer 202 and/or document tokenizer 204, according to an embodiment. FIG. 5 will be discussed in further detail below. Storage 126 includes tokenizing rules 220 and document storage 224. Tokenizing rules 220 may be used in determining the characteristics of query tokens and document tokens. For example, tokenizing rules 220 may specify token selection rules, such as that any length of white space is to be ignored, that punctuation is to be ignored, that formatting tags are to be ignored, and the like. Document feeder 206 is configured to enqueue the documents, or tokenized documents, to be processed and to make the enqueued documents available for processing. Document feeder 206 may retrieve documents from document storage 224, for example, an email or other document archive, and feed these documents to document tokenizer 204. Queries 222 may be preconfigured or may be entered by a user. A query may include one or more words or expressions. Compare module 208 is configured to match queries to documents, according to an embodiment. Memory 124 includes tokenized queries 226, tokenized documents 228, selected query tokens buffer 232, selected document tokens buffer 234, and tasks 240. Tokenized queries 226 may be matched to tokenized documents 228. Compare module 208 may use buffer compare module 210 to compare a buffer of query tokens 232 to a buffer of document tokens 234. Tasks 240 includes concurrently executing document processing tasks.

Figure 3:
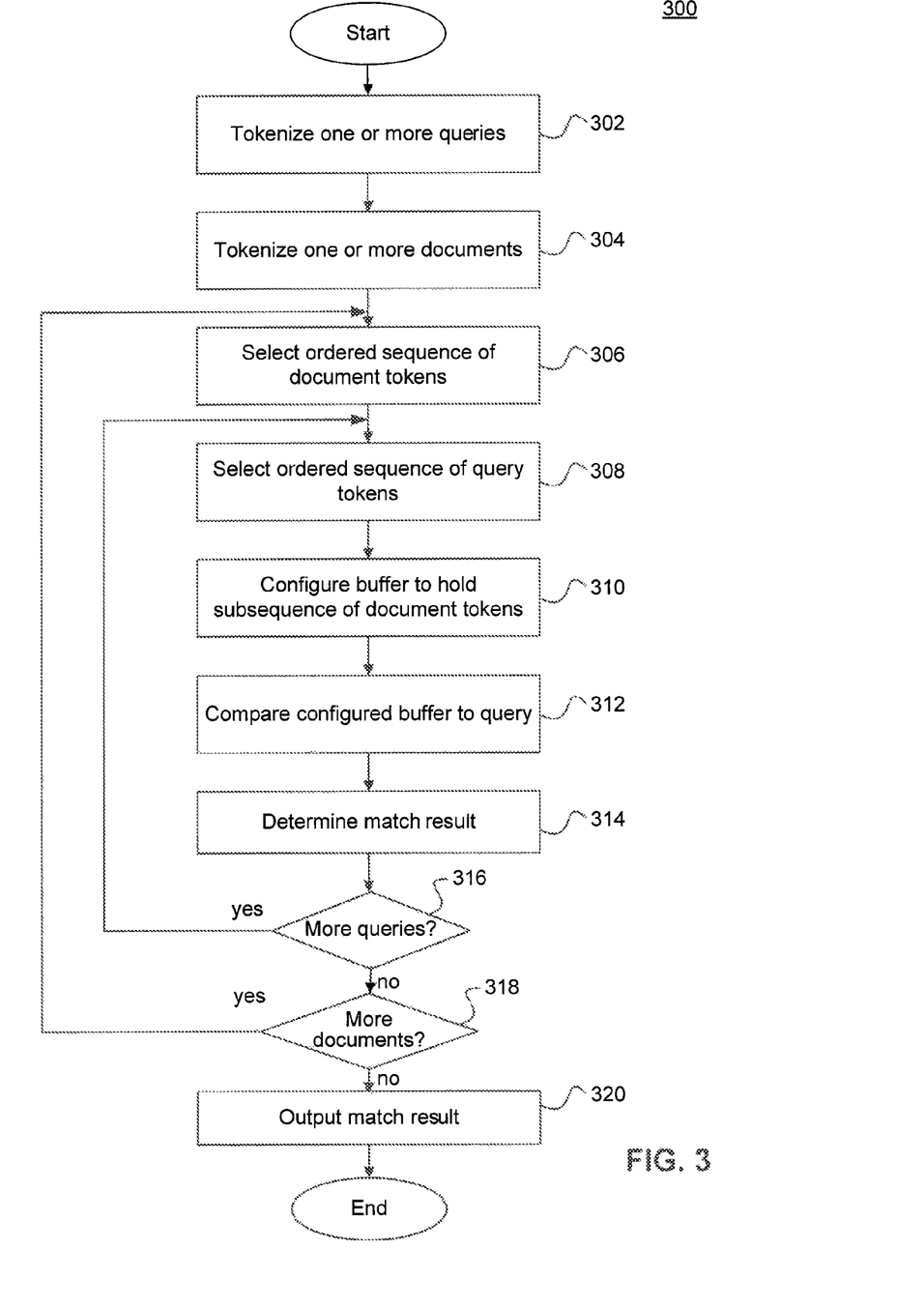
FIG. 3 illustrates a method for matching queries to a document, according to an embodiment.

FIG. 3 illustrates a method 300 (steps 302-322) for matching one or more queries to one or more documents, according to an embodiment. Method 300 can, for example, be used by query matching module 201 to match one or more queries to a collection of documents. According to an embodiment, method 300 can be used to match one or more query terms or expressions to one or more documents at a node in a distributed system for analyzing documents, such as an electronic discovery system.

The querying of one or more documents using method 300 may begin at step 302. At step 302, one or more queries are tokenized. The tokenizing of a query, for example, to detect the presence of a query term or expression in documents, may generate a sequence of tokens from each query.

A token can be a character, a word, or a sequence of words and/or other characters (e.g., expressions). Tokens may or may not include white space. Rules for determining tokens may be configurable, for example, as tokenizing rules 220. According to an embodiment, in a given stream of characters from a query or document, each word of one or more characters, ignoring whitespace, is considered as a token.

At step 304, one or more documents are tokenized. The tokenizing of the one or more documents results in a sequence of tokens generated from each of the one or more documents. As noted above, a token can be a character, a word, or a sequence of words and/or other characters (e.g., expressions). The rules for selecting tokens from documents may be the same as the rules for selecting tokens from queries.

Steps 306-318 can be repeated to match each document at a node to each of the queries. For example, in a single iteration of steps 306-316, one document may be matched to all of the queries to be processed at a node.

At step 306, an ordered sequence of document tokens are selected. The number of document token to be selected at this stage can be determined by the number of query tokens selected at step 308 above. For example, each iteration of 306-318 compares a subsequence of tokens of a document to a query, and the size of the subsequence for each iteration may be determined based upon the size of the selected query. The document tokens are selected from a stream of document tokens generated, for example, at step 304. The tokens may be selected sequentially starting from the first token of a document.

At step 308, an ordered sequence of query tokens are selected. According to an embodiment, the ordered sequence of tokens corresponding to a query is selected. For example, the selected ordered sequence may include one or more tokens representing respective words of a query expression. The selected query may be referred to below as the "current query."

At step 310, the selected document tokens are input to a token buffer for document tokens ("document token buffer"). According to an embodiment, the document token buffer is a first-in-first-out (FIFO) queue. The document token buffer is configured to hold a number of tokens corresponding to the number of query tokens to be matched against. According to an embodiment, the number of tokens representing the current query (i.e., query being currently matched against) is determined, and the size of the document token buffer is configured accordingly. For example, if the currently matched query is represented by 3 tokens, the document token buffer may be sized for 3 tokens.

Figure 4:
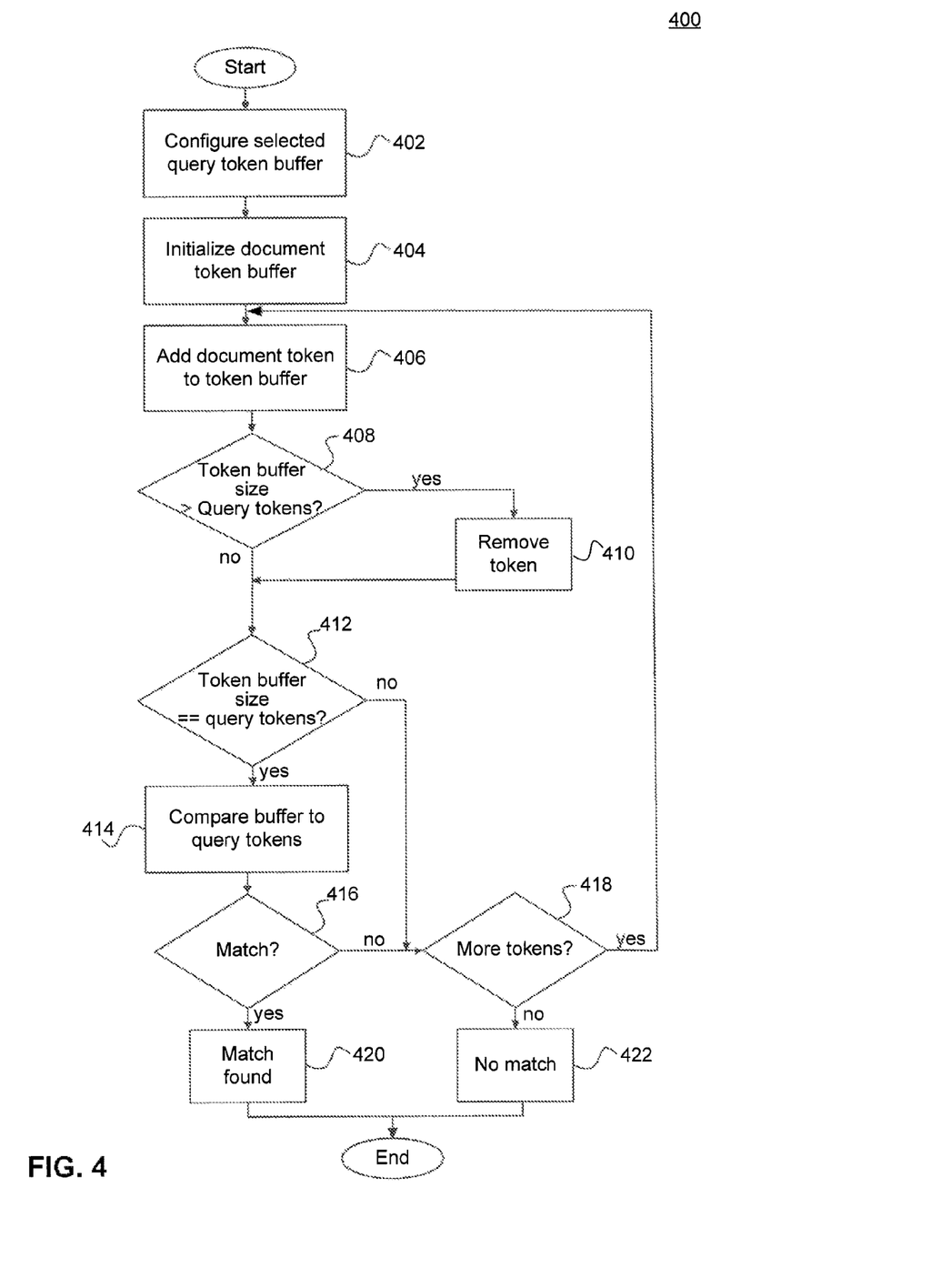
FIG. 4 illustrates a method for matching one query to one document, according to an embodiment.

At step 312, the document token buffer is compared to the current query. In accordance with an embodiment, the document token buffer is compared to a buffer holding the query tokens. The comparison at this step may include a series of comparisons, as document tokens are fed into the document token buffer until a match is found or the entire document or group of documents is analyzed. According to an embodiment, an exact match of the query tokens to the document tokens in the buffer is required. FIG. 4, discussed below, further describes the process of comparing a query to a document and determining a match.

Figure 6:
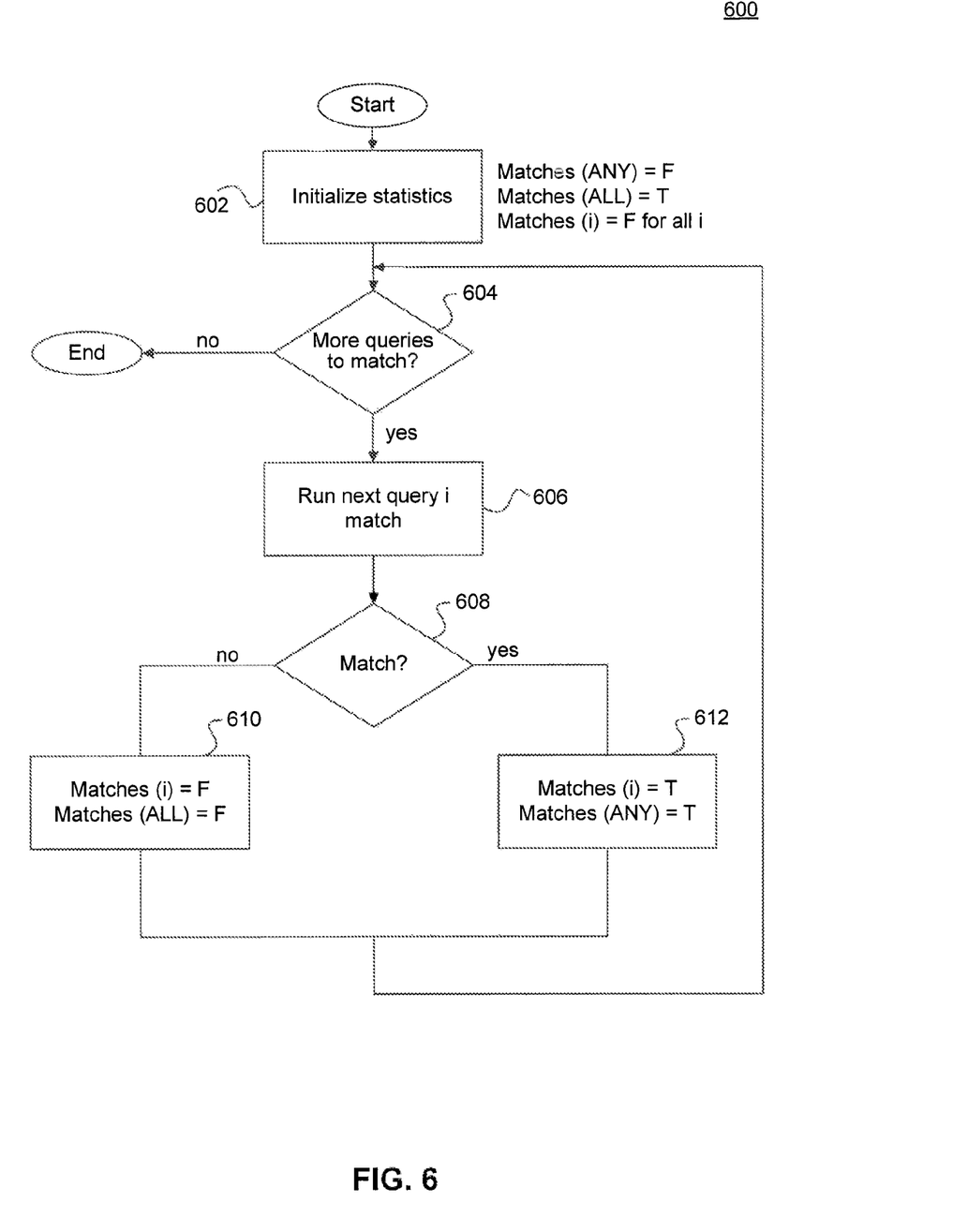
FIG. 6 illustrates a method for updating statistics during the matching of queries to documents, according to an embodiment.

At step 314, the result of matching the current query to the selected document is determined based upon the comparison at step 312. The result may be a Boolean "match" or "no match" determination. Based upon the determination, other desired steps may be initiated. For example, at this stage, a record may be maintained of which query matched which of the documents. Additional statistics may be maintained to summarize the query match against the collection of documents. FIG. 6 illustrates a method for maintaining statistics, according to an embodiment.

At step 316, it is determined whether any more queries are to be matched against the currently selected document. If yes, then method 300 proceeds back to step 308 to select an ordered sequence of tokens representing, for example, the next query to be matched against the documents at the node. Steps 308-316 may be repeated to match each of the queries to be matched against documents at the node.

If, at step 316, it is determined that no more queries are to be compared against the current query, method 300 proceeds to step 318. If, at step 318, it is determined that more queries are to be analyzed, then method 300 proceeds back to step 306 and selects another sequence of ordered document tokens, for example, representing the next document to be matched against the current query. Steps 306-318 may be repeated to compare each of the documents to be analyzed at the node to each of the queries.

When, at step 316, it is determined that no more queries are to be compared against the current document, method 300 proceeds to step 318. At step 318, it is determined whether any more queries are to be matched against the documents at the node. If yes, then method 300 proceeds back to step 306 to select an ordered sequence of tokens representing, for example, the next query to be matched against the documents at the node. Steps 306-318 may be repeated to match each of the queries to be matched against documents at the node.

When, at step 318, it is determined that no more queries are to be matched against the documents at the node, method 300 proceeds to step 320. At step 320, the match result may be output. The output result may include, for each query, the documents that contained a match and/or the documents that did not contain a match. The result may also include the number of documents in each category, and/or the number of matches for a particular query in each of the matched documents.

FIG. 4 illustrates a method 400 (steps 402-416) for matching a query to a document, according to an embodiment. Method 400 may start at step 402. At step 402, a buffer is configured to hold the selected query (i.e. current query). More specifically, a buffer (referred to as "query token buffer") can be configured to hold all the tokens of a query.

At step 404, another buffer, referred to as a document token buffer, is initialized. Initialization may include creating the buffer and setting its values to an initial state. The document token buffer is configured to hold tokens generated from the document to be matched to the current query. According to an embodiment, the size of the document token buffer is configured to accommodate the same number of tokens as in the current query. According to an embodiment, the document token buffer is configured as a FIFO queue.

Steps 406-416 represent the processing that is performed until either the current document is completely analyzed, or a match is found. At step 406, a document token is added to the document token buffer. For example, a token from an ordered sequence of document tokens derived from the current document may be input to the document token buffer.

At step 408, it is determined whether the size of the document token buffer is greater than the number of query tokens in the query token buffer. If "yes," at step 410, a token is removed from the document token buffer. In accordance with the FIFO discipline, the earliest input token is removed from the document token buffer. If, at step 408, it is determined that the size of the document token buffer is not greater than the number of query tokens in the query token buffer, or after the document token is removed at step 410, then at step 412, it is determined whether the size of the document token buffer is equal to the number of query tokens in the query token buffer. If "no," then at step 418, it is determined whether more document tokens are available to be processed, and if so, method 400 returns to step 406 to add the next token in the ordered sequence to the document token buffer. In this manner, the token buffer contains successive subsequences of the ordered sequence of tokens that correspond to the current document.

When, at step 412, it is determined that the size of the document token buffer is equal to the number of query tokens in the query token buffer, then method 400 proceeds to compare the document token buffer to the query token buffer at step 414. Because each buffer contains a sequence of tokens in the desired order, the comparison may be performed as a buffer to buffer comparison. In another embodiment, the comparison may be performed by comparing the respective tokens in each buffer. The comparison, however, is directed to comparing a query term or expression, as represented by the tokens in the query token buffer, to a string from the document, as represented by the current sequence of tokens in the document token buffer.

At step 416, it is determined whether a match has been found based on the comparison at step 414. If a match has been found, method 400 has successfully identified that the current query matched the selected document, and method 400 may proceed to perform any processing associated with having found a match at step 420. If no match has been found, then method 400 proceeds to step 418 to process the rest of the document, if applicable. As method 400 iterates through step 418, if it is determined that no more tokens are available, then the end of the document has been reached without finding a match for the current query, and method 400 may proceed to perform any processing associated with finding no matches in step 422. After the completion of steps 420 or 422, if applicable, method 400 may terminate.

FIG. 5 illustrates a method 500 for tokenizing documents and queries, according to an embodiment. According to an embodiment, method 500 may be used to uniformly generate tokens for the queries and also for the documents to be analyzed. By using the same tokenizing rules and token generation method for both the queries and the documents, the uniformity of tokenized representation of the queries and documents is improved.

Method 500 may start at step 502. At step 502, a tokenizer is initialized. The initialization of the tokenizer may include initializing a pointer indicating the current location of the tokenizer in a document being processed. The pointer may be initialized to the beginning of the document.

At step 504, the first token is selected. According to an embodiment, the tokenizer may read from the current location of the pointer to the next whitespace, and treat the characters read as a potential token. The pointer's current location has now changed to the character position immediately after the potential token.

The potential token is then evaluated against one or more tokenization rules. According to the embodiment being described, at step 506, it is determined whether the potential token is an HTML tag or other formatting tag. For example, web-based queries, formatted emails, or other documents may include formatting tags that may need to be ignored in the comparisons.

At step 508 it is determined whether the potential token is white space, and at step 510 it is determined whether the potential token matches any punctuation, word or any other string that should not be considered as a token. Additional conditions for determining if a potential token should be considered as a valid token may be included in the processing of method 500.

If any of the steps 506, 508 or 510 evaluate to "yes", then the potential token is discarded at step 512. Otherwise, at step 514, the potential token is added to a sequence of valid tokens.

Subsequent to either discarding the token at step 510 or outputting the token at step 512, method 500 proceeds to step 516, where it is determined whether more of the document or query remains to be tokenized.

At step 518, the next potential token is selected. Determining the next potential token may be performed similarly to selecting the first potential token, as described above. After the next potential token has been determined, method 500 proceeds to step 506 to determine the validity of the potential token.

FIG. 6 illustrates a method 600 (steps 602-612) for maintaining statistics during the matching of queries to documents, according to an embodiment. According to an embodiment, method 600 is used by an instance of method 300 to maintain statistics for all the queries and documents processed by that instance. A litigation support system may include one or more instances of method 300 executing, for example, in a distributed system to concurrently process documents. A distributed system where such concurrent processing is facilitated is disclosed in the U.S. patent application Ser. No. 13/467,932 filed on May 9, 2012, titled "Method and System for Processing a Large Collection of Documents." U.S. patent application Ser. No. 13/467,932 filed on May 9, 2012, is hereby incorporated by reference in its entirety.

For example, processing of files may be performed by concurrently executing processes (tasks) in a distributed system. According to an embodiment, each of the concurrent processes may be configured to process any subset of a plurality of queries over any subset of a plurality of documents. Method 600 can be used, for example, by each of the concurrent processes to efficiently track statistics and matching information for documents in a litigation support system, or other system, where it may be desirable to track what queries returned positive results over the respective documents, and various aggregations of that information. The statistics referred to in method 600 can be maintained in a global memory, and each concurrent task may independently update one or more statistics for which it is responsible.

Method 600 may start at step 602 by initializing one or more statistics. The statistics may be maintained in a memory accessible by any process executing method 300, or other method, which matches one or more queries to one or more documents. According to an embodiment, the following statistics are maintained for each document to be analyzed: Matches(ANY), Matches(ALL), and Matches(i) for each of i queries. Matches(ANY) represents whether the document matched at least one of the queries, Matches(ALL) represents that the document matched all queries, and Matches(i) represents whether the document matched the $i^{th}$ query. At initialization, the values for a particular document may be configured as Matches(ANY)=FALSE, Matches(ALL)=TRUE, and Matches(i)=FALSE for all i.

For each document processed, steps 604-612 are repeated for each query to be matched against. At step 604, the next query to be run is chosen. The queries may be chosen in any order. If there are no more queries to be run over the selected document, then process 600 terminates.

Otherwise, at step 606, the chosen query is compared to the current document. Matching of a query to a document may be performed in accordance with method 400 described above.

Based upon the comparison, at step 608, it is determined whether the query (i.e., query i) matched the current document. According to an embodiment, as described above in relation to method 400, the comparison of the query to the document may be performed by comparing a buffer of tokens representative of the query to a FIFO buffer of tokens successively representing portions of the current document. If a match occurred, then at step 612, the statistics for the document are updated to reflect Matches(i)=T and Matches(ANY)=TRUE. If no match occurred, then at step 610, the statistics are updated to reflect Matches(i)=FALSE and Matches(ALL)=FALSE.

As noted above, the set of queries and the set of documents may be processed at several nodes in a distributed system, with each node processing a subset of the documents and/or queries. According to an embodiment, method 300 may be executed at each of the several nodes that process any subset of documents and/or queries. Each instance of method 300 may perform statistics collection using method 600. Two or more instances of method 300, when respective processing is completed, may aggregate their statistics. When statistics are written to a global memory as described above, the aggregation step may or may not require additional processing. When the respective instances of method 300 process mutually exclusive sets of files (e.g., different sets of files at each node, with the same set of queries) then no additional steps may be required for aggregation. However, if the instances of method 300 process the same set of files, or sets of files that are not mutually exclusive (e.g., same set of files at each node, but different subsets of queries), then aggregation may require that, for example, Matches(ANY) and Matches(ALL) are correctly determined for the aggregated result.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A computer-implemented method for analyzing a collection of documents, comprising:
    (a) tokenizing one or more queries to generate an ordered sequence of query tokens for each query;
    (b) tokenizing one or more documents to generate an ordered sequence of document tokens for each document;
    (c) selecting an ordered sequence of document tokens from the tokenized one or more documents;
    (d) selecting an ordered sequence of query tokens from the tokenized one or more queries;
    (e) configuring a buffer to hold a subsequence of the selected ordered sequence of document tokens;
    (f) comparing the selected ordered sequence of query tokens to successive subsequences of the selected ordered sequence of document tokens in the configured buffer, wherein each of the successive subsequences and the selected ordered sequence of query tokens have the same length in tokens;
    (g) determining a match result based upon the comparison; and
    (h) updating one or more statistics based upon the determined match result, wherein the one or more statistics are stored in global memory, wherein the one or more statistics are updated asynchronously by two or more processes executing steps (a)-(g), and wherein each of the two or more processes steps (a)-(g) for at least one document and at least one query, including generating a first match result by the first process and a second match result by the second process, wherein the first match result and the second match result are combined as the determined match result.

2. The computer-implemented method of claim 1, wherein configuring the buffer comprises:
    configuring the buffer as a first-in-first-out buffer to hold a number of tokens equal to a number of tokens in the selected ordered sequence of query tokens.

3. The computer-implemented method of claim 2, wherein the comparing comprises:
    sequentially inputting tokens from the selected ordered sequence of document tokens into the first-in-first-out buffer; and
    comparing, upon each said sequential input of a token, the selected ordered sequence of query tokens to the first-in-first-out buffer.

4. The computer-implemented method of claim 3, wherein the sequentially inputting tokens includes removing a token from the first-in-first-out buffer, wherein the removed token is an earliest input token in the first-in-first-out buffer.

5. The computer-implemented method of claim 1, wherein the comparing comprises comparing two buffers of a same dimension and same data type, wherein the two buffers comprise the selected ordered sequence of query tokens in a first buffer, and one of the subsequences of the selected ordered sequence of document tokens in the configured buffer.

6. The computer-implemented method of claim 1, wherein the one or more statistics include one or more statistics for each document, and wherein the one or more statistics for each document indicate at least one of whether the document matches any of said queries or whether the document matches all of the queries.

7. The computer-implemented method of claim 6, wherein the statistics further indicate specific ones of the queries which match the document.

8. The computer-implemented method of claim 1, wherein the first query and the second query are parts of a complex query, and wherein the combination of the first match result and the second match result represent a match result for the complex query.

9. The computer-implemented method of claim 1, further comprising:
    executing a plurality of tasks in parallel, wherein each task performs at least steps (e)-(g) for a selected document from the one or more documents and a selected query from the one or more queries; and outputting the match result based upon the executed plurality of tasks.

10. A document analysis system, comprising:
(a) one or more processors;
(b) one or more memories, each coupled to at least one of the processors;
(c) one or more document token buffers configured in the one or more memories;
(d) one or more query token buffers configured in the one or more memories;
(e) a tokenizing rules file configured in the one or more memories and including rules for token generation;
(f) a query tokenizer configured to, when executed by the one or more processors, cause the one or more processors to tokenize one or more queries to generate an ordered sequence of query tokens for each query;
(g) a document tokenizer configured to, when executed by the one or more processors, cause the one or more processors to tokenize one or more documents to generate an ordered sequence of document tokens for each document;
(h) a document feeder configured to, when executed by the one or more processors, cause the one or more processors to configure the one or more document token buffers to hold one or more subsequences of the selected ordered sequence of document tokens; and
(i) a comparing module configured to, when executed by the one or more processors, cause the one or more processors to:
select an ordered sequence of document tokens from the tokenized one or more documents;
select an ordered sequence of query tokens from the tokenized one or more queries;
compare the selected ordered sequence of query tokens to successive subsequences of the selected ordered sequence of document tokens in the configured document token buffer, wherein each of the successive subsequences and the selected ordered sequence of query tokens have the same length in tokens;
determine a match result based upon the comparison; and
update one or more statistics based upon the determined match result, wherein the one or more statistics are stored in global memory, wherein the one or more statistics are updated asynchronously by two or more processes executing (e)-(i), and wherein each of the two or more processes performs (e)-(i) for at least one document and at least one query, including generating a first match result by the first process and a second match result by the second process, wherein the first match result and the second match result are combined as the determined match result.

11. The system of claim 10, wherein the document token buffer is a first-in-first-out buffer that holds a number of tokens equal to a number of tokens in the selected ordered sequence of query tokens.

12. The system of claim 11, wherein the document feeder is further configured to cause the one or more processors to sequentially input tokens from the selected ordered sequence of document tokens into the first-in-first-out buffer, and wherein the comparing module is further configured to cause the one or more processors to:
compare, upon each sequential input of a token, the selected ordered sequence of query tokens to the first-in-first-out buffer.

13. The system of claim 12, wherein the document feeder is further configured to cause the one or more processors to remove a token from the first-in-first-out buffer, wherein the removed token is an earliest input token in the first-in-first-out buffer.

14. An article of manufacture comprising a computer readable storage medium having instructions encoded thereon that, when executed by a computing device, cause the computing device to perform operations comprising:
(a) tokenizing one or more queries to generate an ordered sequence of query tokens for each query;
(b) tokenizing one or more documents to generate an ordered sequence of document tokens for each document;
(c) selecting an ordered sequence of document tokens from the tokenized one or more documents;
(d) selecting an ordered sequence of query tokens from the tokenized one or more queries;
(e) configuring a buffer to hold one or more subsequences of the selected ordered sequence of document tokens;
(f) comparing the selected ordered sequence of query tokens to successive subsequences of the selected ordered sequence of document tokens in the configured buffer, wherein each of the successive subsequences and the selected ordered sequence of query tokens have the same length in tokens;
(g) determining a match result based upon the comparison; and
(h) updating one or more statistics based upon the determined match result, wherein the one or more statistics are stored in global memory, wherein the one or more statistics are updated asynchronously by two or more processes executing operations (a)-(g), and wherein each of the two or more processes performs operations (a)-(g) for at least one document and at least one query, including generating a first match result by the first process and a second match result by the second process, wherein the first match result and the second match result are combined as the determined match result.

15. The article of manufacture of claim 14, wherein configuring the buffer comprises:
configuring the buffer as a first-in-first-out buffer to hold a number of tokens equal to a number of tokens in the selected ordered sequence of query tokens.

16. The article of manufacture of claim 15, wherein the comparing comprises:
sequentially inputting tokens from the selected ordered sequence of document tokens into the first-in-first-out buffer; and
comparing, upon each said sequential input of a token, the selected ordered sequence of query tokens to the first-in-first-out buffer.

17. The article of manufacture of claim 16, wherein the sequentially inputting tokens includes removing a token from the first-in-first-out buffer, wherein the removed token is an earliest input token in the first-in-first-out buffer.

* * * * *